(12) United States Patent
Ong et al.

(10) Patent No.: US 7,666,950 B2
(45) Date of Patent: Feb. 23, 2010

(54) PROCESS FOR PREPARING HYDROGENATED NITRILE RUBBERS

(75) Inventors: Christopher M. Ong, Leverkusen (DE); Stephen Pask, Dormagen (DE); Sharon Guo, Pudong Shanghai (CN); Franz Mersmann, Bergisch Gladbach (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 11/807,502

(22) Filed: May 29, 2007

(65) Prior Publication Data

US 2007/0287806 A1 Dec. 13, 2007

(30) Foreign Application Priority Data

Jun. 1, 2006 (EP) .................. 06011379

(51) Int. Cl.
*C08F 8/04* (2006.01)
(52) U.S. Cl. ............... 525/338; 525/339; 525/329.3; 422/135; 422/186.25; 422/186.14; 422/224
(58) Field of Classification Search ........... 525/338, 525/339, 329.3; 422/135, 186.25, 186.14, 422/224
See application file for complete search history.

(56) References Cited

U.S. PATENT DOCUMENTS

| | | | | |
|---|---|---|---|---|
| 1,284,488 A | * | 11/1918 | Steward ................. | 554/141 |
| 3,700,637 A | * | 10/1972 | Finch, Jr. .............. | 525/329.3 |
| 4,464,515 A | | 8/1984 | Rempel et al. ......... | 525/338 |
| 4,503,196 A | | 3/1985 | Rempel et al. ......... | 525/338 |
| 4,581,417 A | * | 4/1986 | Buding et al. .......... | 525/338 |
| 4,631,315 A | | 12/1986 | Buding et al. .......... | 525/338 |
| 4,746,707 A | | 5/1988 | Fiedler et al. .......... | 525/338 |
| 4,795,788 A | | 1/1989 | Himmler et al. ........ | 525/338 |
| 4,812,528 A | | 3/1989 | Rempel et al. .......... | 525/338 |
| 4,978,771 A | | 12/1990 | Fiedler et al. .......... | 558/459 |
| 6,309,508 B1 | | 10/2001 | Lemme et al. .......... | 159/49 |
| 6,482,960 B1 | | 11/2002 | Brechtelsbauer et al. | 549/332 |
| 6,515,153 B2 | | 2/2003 | Burns et al. ............ | 554/69 |
| 6,596,838 B1 | | 7/2003 | Pinery et al. ........... | 528/170 |
| 6,858,189 B1 | | 2/2005 | Ramshaw et al. ...... | 422/186 |
| 7,032,607 B2 | | 4/2006 | Burns .................... | 137/14 |
| 7,041,751 B2 | | 5/2006 | Jachuck et al. ......... | 526/88 |
| 7,074,353 B2 | | 7/2006 | Jachuck et al. ......... | 264/7 |
| 2003/0088035 A1 | | 5/2003 | Guerin et al. ........... | 525/509 |
| 2003/0180494 A1 | | 9/2003 | Lu ........................ | 428/64.1 |
| 2004/0105795 A1 | | 6/2004 | Gough .................. | 422/201 |

FOREIGN PATENT DOCUMENTS

| | | |
|---|---|---|
| DE | 25 39 132 | 4/1987 |
| WO | 2004/004888 | 1/2004 |
| WO | 2006/008510 | 1/2006 |
| WO | WO 2006/008510 A1 * | 1/2006 |
| WO | 2006/018622 | 2/2006 |

OTHER PUBLICATIONS

Macromolecules 1987, 20, pp. 2362-2368; Mohammadi and Rempel; "Homogeneous Selective Catalytic Hydrogenation of C=C in Acrylonitrile-Butadiene Copolymer" American Chemical Society. Rev. Macromol. Chem. Phys., C35(2), 239-285 (1995); McManus and Rempel; "Chemical Modification of Polymers: Catalytic Hydrogenation and Related Reactions".
European Search Report from co-pending Application No. 07010189.4-1214/1864277 dated Oct. 12, 2009.

* cited by examiner

*Primary Examiner*—Ling-Siu Choi
(74) *Attorney, Agent, or Firm*—Jennifer R. Seng

(57) ABSTRACT

The present invention provides a novel process for preparing hydrogenated nitrile rubbers comprising subjecting nitrile rubbers in a spinning disk reactor to hydrogenation. The present process is less demanding with regard to its reaction conditions, like e.g. the hydrogen pressure to be applied, compared to known processes and significantly reduces the cost of the hydrogenation process and in particular the equipment cost.

24 Claims, 1 Drawing Sheet

*Principal design of a SDR*

PROCESS FOR PREPARING HYDROGENATED NITRILE RUBBERS

FIELD OF THE INVENTION

The invention relates to a new process for the preparation of hydrogenated nitrile rubbers by hydrogenation of nitrile rubbers using a specific type of reactor.

BACKGROUND OF THE INVENTION

Hydrogenated nitrile rubber ("HNBR"), is generally prepared by the selective hydrogenation of a nitrile rubber ("NBR") which is a co-polymer comprising repeating units of at least one conjugated diene, at least one α,β-unsaturated nitrile and optionally further comonomers. HNBR represents a specialty rubber which has very good heat resistance, excellent ozone and chemical resistance, as well as excellent oil resistance. Coupled with the high level of mechanical properties of the rubber, in particular the high resistance to abrasion, it is not surprising that NBR as well as HNBR have found widespread use in the automotive (seals, hoses, bearing pads) oil (stators, well head seals, valve plates), electrical (cable sheathing), mechanical engineering (wheels, rollers) and shipbuilding (pipe seals, couplings) industries, amongst others.

In general commercially available HNBR has a Mooney viscosity (ML 1+4 @100° C.) in the range of from 55 to 120 (determined using ASTM test D1646), a molecular weight $M_w$ in the range of from 200,000 to 500,000, a polydispersity greater than 3.0 and a residual double bond (RDB) content of up to 18% (determined by IR spectroscopy).

In recent times it has been disclosed in WO-A-02/100941 and WO-A-02/100905 that a low Mooney HNBR may be prepared by using a combination of a metathesis reaction and a subsequent hydrogenation. Such low Mooney HNBR has a Mooney viscosity (ML 1+4 @100° C.) in the range of from 2 to 50, a molecular weight $M_w$ in the range of from 30.000 to 250.000, and a polydispersity index of typically less than 3.

The principle technique of hydrogenating NBR is known to any artisan and well described in literature. In Macromolecules, 1987, 20, 2362 N. A. Mohammadi and G. L. Rempel describe the homogeneous selective catalytic hydrogenation of C=C double bounds in acrylonitrile-butadiene copolymers. Specifically examined is the hydrogenation of NBR utilizing Wilkinson's catalyst [RhCl(P($C_6H_5$)$_3$)$_3$]. A spectroscopic analysis of NBR and HNBR was performed and compared in order to understand the fundamental changes to the polymer resulting from the hydrogenation process. In Rev. Macromol. Chem. Phys., 1995, C35(2), 239-285 N. T. McManus and G. L. Rempel describe catalytic hydrogenation and related reactions, covering the hydrogenation of polymers in general (NBR, SBR, polybutadiene) using several different catalyst systems, e.g. based on Rh, Ru, Pd and Tr, capable of performing polymer hydrogenation.

Presently the hydrogenation of NBR on a large commercial scale is carried out batch-wise using either homogenous or heterogeneous catalysts. Such batch-production is linked to some disadvantages. With regard to the homogeneous catalysts one disadvantage of major importance is due to the fact that the hydrogenation process of NBR is mass diffusion controlled. Therefore the ability of the homogeneous catalyst to efficiently locate and hydrogenate the double bonds of the NBR is limiting to the present batch process commercially, leading to very high manufacturing costs. Additionally the diffusion problem also applies to the hydrogen, as it is only slightly soluble in monochlorobenzene, which is the predominantely used solvent in such hydrogenation. To get enough hydrogen into the solution to perform the hydrogenation reaction requires massive pressure in the range of from 65 to 90 bar.

Additionally the most obvious characteristic of a batch hydrogenation reactor is that it produces HNBR batches which results in a specific quantity, usually dictated by the process equipment. If customers want smaller quantities than the batch size then stocks and warehousing is required. Also, the introduction of new HNBR grades into the market may be a problem, as the batch size is very likely much larger than the trial quantities required. This results in either utilization of expensive warehousing or the necessity to establish small pilot plant facilities to produce smaller quantities for trial sampling.

Most batch hydrogenation reactors are utilized for the production of a variety of different HNBR grades. The need for cleaning the reactor between different batches therefore becomes an issue. Not only does cleaning take time, but there is often associated cost of material loss and the need perhaps to dispose of cleaning solvents. Therefore, companies tend to minimize grade changes and once more there is a demand to build product inventory to satisfy customer requirements. New grades and products can be difficult to introduce with large stocks of old material in store. Furtheron, warehouses are expensive not just due to the building and operation overhead expenses but also due to the amount of working capital tied up.

The current batch-wise hydrogenation has the additional disadvantage that the reaction needs to be carried out at very high hydrogen pressures, e.g. at a pressure above 80 bar. This results in extensive and expensive safety requirements that need to be met by both the reactor and surrounding equipment.

SUMMARY OF THE INVENTION

The object of the present invention was therefore to provide a process being less demanding with regard to its reaction conditions, like e.g. the hydrogen pressure to be applied, and to further reduce the cost of the hydrogenation process and in particular the equipment cost.

DETAILED DESCRIPTION OF THE INVENTION

This object was solved by providing a new process for preparing hydrogenated nitrile rubbers by subjecting nitrile rubbers in a spinning disk reactor to hydrogenation.

The starting polymer to be used in the new process is a nitrile rubber ("NBR").

As used throughout this specification, the term "nitrile rubber" or "NBR" is intended to have a broad meaning and is meant to encompass an elastomer having repeating units derived from at least one conjugated diene, at least one α,β-unsaturated nitrile, and optionally one or more copolymerizable monomers.

The conjugated diene may be any known conjugated diene, preferably a $C_4$-$C_6$ conjugated diene. Preferred conjugated dienes are 1,3-butadiene, isoprene, piperylene, 2,3-dimethyl butadiene and mixtures thereof. Even more preferred $C_4$-$C_6$ conjugated dienes are 1,3-butadiene, isoprene and mixtures thereof. The most preferred $C_4$-$C_6$ conjugated diene is 1,3-butadiene. The α,β-unsaturated nitrile may be any known α,β-unsaturated nitrile, preferably a ($C_3$-$C_5$) α,β-unsaturated nitrile. Preferred ($C_3$-$C_5$) α,β-unsaturated nitriles are acrylonitrile, methacrylonitrile, ethacrylonitrile and mixtures thereof. The most preferred ($C_3$-$C_5$) α,β-unsaturated nitrile is acrylonitrile.

A very preferred nitrile rubber is a copolymer of acrylonitrile and 1,3-butadiene.

Besides the repeating units derived from the conjugated diene and the α,β-unsaturated nitrile the nitrile rubber may optionally further contain repeating units derived from one or more copolymerizable monomers, such as e.g. α,β-unsaturated mono- or dicarboxylic acids, their esters or amides. As α,β-unsaturated mono- or dicarboxylic acids fumaric acid, maleic acid, acrylic acid and methacrylic acid are preferred. As esters of α,β-unsaturated carboxylic acids alkyl esters and alkoxyalkyl esters are preferred. More preferred alkyl esters of α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. More preferred alkoxyalkyl esters of α,β-unsaturated carboxylic acids are methoxyethyl (meth)acrylate, ethoxyethyl (meth) acrylate and methoxyethyl (meth)acrylate. It is also possible to use mixtures of alkyl esters, like the aforementioned, and alkoxyalkyl esters, like the aforementioned.

The percentages of the repeating units derived from the conjugated diene and the α,β-unsaturated nitrile may vary broadly in the nitrile rubber. Typically the nitrile rubber contains in the range of from 40 to 90% b.w., preferably in the range of from 60 to 85% b.w of the conjugated diene, based on the nitrile rubber, and in the range of from 10 to 60% b.w., preferably in the range of from 15 to 40% b.w. of the α,β-unsaturated nitrile, based on the nitrile rubber. Repeating units derived from one or more copolymerizable monomers will replace either the nitrile or the diene portion of the nitrile rubber and it will be apparent to the skilled in the art that the above mentioned figures will have to be adjusted to result in 100% b.w. Optionally such additional monomers are present in an amount of from 0 to 40% b.w., preferably of from 0.1 to 40% b.w and more preferably of from 1 to 30% b.w., based on the nitrile rubber.

The production process of NBR by polymerizing the aforementioned monomers is well known to any artisan and described in polymer literature in detailed form.

Commercially available NBR is typically manufactured by emulsion polymerization. The monomers are emulsified in water, a free radical-generating catalyst is added and the mixture is agitated whilst a constant temperature is maintained. After the desired degree of polymerization is reached, a shortstop and stabilizers are added to the reaction system causing termination of the polymerization process. Generally, NBR obtained by this process has a Mooney viscosity (ML 1+4 @100° C.) in the range of from 30 to 90, preferably in the range of from 30 to 70, more preferably in the range of from 30 to 50, a molecular weight Mw in the range of from 200,000 to 500,000, preferably in the range of from 200,000 to 400,000, a molecular weight Mn in the range of from 80,000 to 150,000 and a polydispersity index PDI in the range of from 2.0 to 6.0, preferably in the range of from 2.0 to 4.0.

The Mooney viscosity (ML 1+4 @100° C.) of the rubber is generally determined using ASTM test D1646.

In addition, so-called "liquid NBR" having a very low viscosity and a low molecular weight can be produced by adding the shortstop agent early in the reaction process. As in the case of regular NBR, the resulting liquid NBR has a polydispersity PDI greater than 3.0. The viscosity is typically not measured anymore according to Mooney, but determined by solution viscosity (i.e. by using a Brookfield viscometer).

NBR suited as starting material of the novel process may either be prepared pursuant to the described known polymerization techniques or be purchased, e.g. with different grades of the product line Perbunan® and Krynac® available from Lanxess Deutschland GmbH.

The hydrogenation of nitrile rubbers pursuant to the process of the present application is preferably carried out in the presence of a hydrogenation catalyst, more preferably in the presence of a homogeneous hydrogenation catalyst. Rhodium, ruthenium, titanium, platinum, iridium, palladium, rhenium, osmium, cobalt or copper may be used either as metal or preferably in form of suitable metal compounds (see e.g. U.S. Pat. No. 3,700,637, DE-A-25 39 132, EP-A-0,134, 023, DE-OS-35 41 689, DE-OS-35 40 918, EP-A-0 298 386, DE-OS-35 29 252, DE-OS-34 33 392, U.S. Pat. No. 4,464, 515 and U.S. Pat. No. 4,503,196 as far as the hydrogenation catalysts and the preparation thereof is concerned).

The hydrogenation is for example carried out in the presence of a rhodium or ruthenium containing catalyst. Suitable are for example catalysts of the following general formula (I)

$$(R^1_m B)_l MX_n \qquad (I)$$

wherein

M is ruthenium or rhodium, $R^1$ are different or equal and represent $C_1$-$C_8$-alkyl, $C_4$-$C_8$-cycloalkyl, $C_6$-$C_{15}$-aryl or $C_7$-$C_{15}$-aralkyl, B is phosphorus, arsenic, sulphur or a sulphoxide group (S=O), X is hydrogen or an anion, preferably halogen and more preferably chlorine or bromine, l is 2, 3 or 4, m is 2 or 3 and n is 1, 2 or 3, preferably 1 or 3.

Preferred catalysts are tris(triphenylphosphine)-rhodium (I)-chloride, tris(triphenylphosphine)-rhodium(III)-chloride, tris(dimethylsulfoxid)-rhodium(III)-chloride, tetrakis(triphenyl phosphine)-rhodium-hydride, and the corresponding compounds in which the triphenylphosphine moiety is partially or completely replaced by tricyclohexylphosphine.

The catalyst can be used in small amounts. Typically an amount in the range from 0.005-1% by weight, preferably in the range from 0,01-0,5% by weight and more preferably in the range from 0,02-0,1% by weight based on the weight of the nitrile rubber is used.

Generally it is helpful to use the catalyst together with a co-catalyst. Such co-catalyst has typically the general formula (II)

$$R^1_m B \qquad (II)$$

wherein $R^1$, m and B shall have the same meanings as for the general formula (I) of the catalyst. Preferably a co-catalyst of formula (II) is used in which m is 3, B is phosphorus and the substituents $R^1$ are different or equal and represent $C_1$-$C_8$-alkyl, $C_4$-$C_8$-cycloalkyl, $C_6$-$C_{15}$-aryl or $C_7$-$C_{15}$-aralkyl. More preferably the co-catalyst posesses trialkyl, tricycloalkyl, triaryl, triaralkyl, diaryl-monoalkyl, diaryl-monocycloalkyl, dialkyl-monoaryl, dialkyl-mono-cycloalkyl, dicycloalkyl-monoaryl or dicycloalkyl-monoaryl substituents, wherein "alkyl" means $C_1$-$C_8$-alkyl, "cycloalkyl" means $C_4$-$C_8$-cycloalkyl, and "aryl" means $C_6$-$C_{15}$-aryl.

Examples of co-catalysts are described in U.S. Pat. No. 4,631,315, a preferred co-catalyst is triphenylphosphine.

Typically 0.1 to 33% b.w. of the co-catalyst, preferably 0.5 to 20% b.w. and even more preferably 0.5 to 5% b.w. of the co-catalyst are used based on 100% b.w. of the nitrile rubber to be hydrogenated.

Preferably the amount of catalyst and co-catalyst is chosen within the above mentioned ranges in such a way that the weight ratio of the catalyst to the co-catalyst lies in the range of from 1: (3-55), and even more preferably in the range of from 1: (5-45) based on 100 parts by weight of the nitrile rubber to be hydrogenated.

The novel process is carried out using a Spinning Disk Reactor ("SDR"). SDRs are already known from literature and suitable SDRs are built, commercialized and sold in customized form by Triton Chemical Systems Ltd. and Protensive Ltd.

Figure 1:
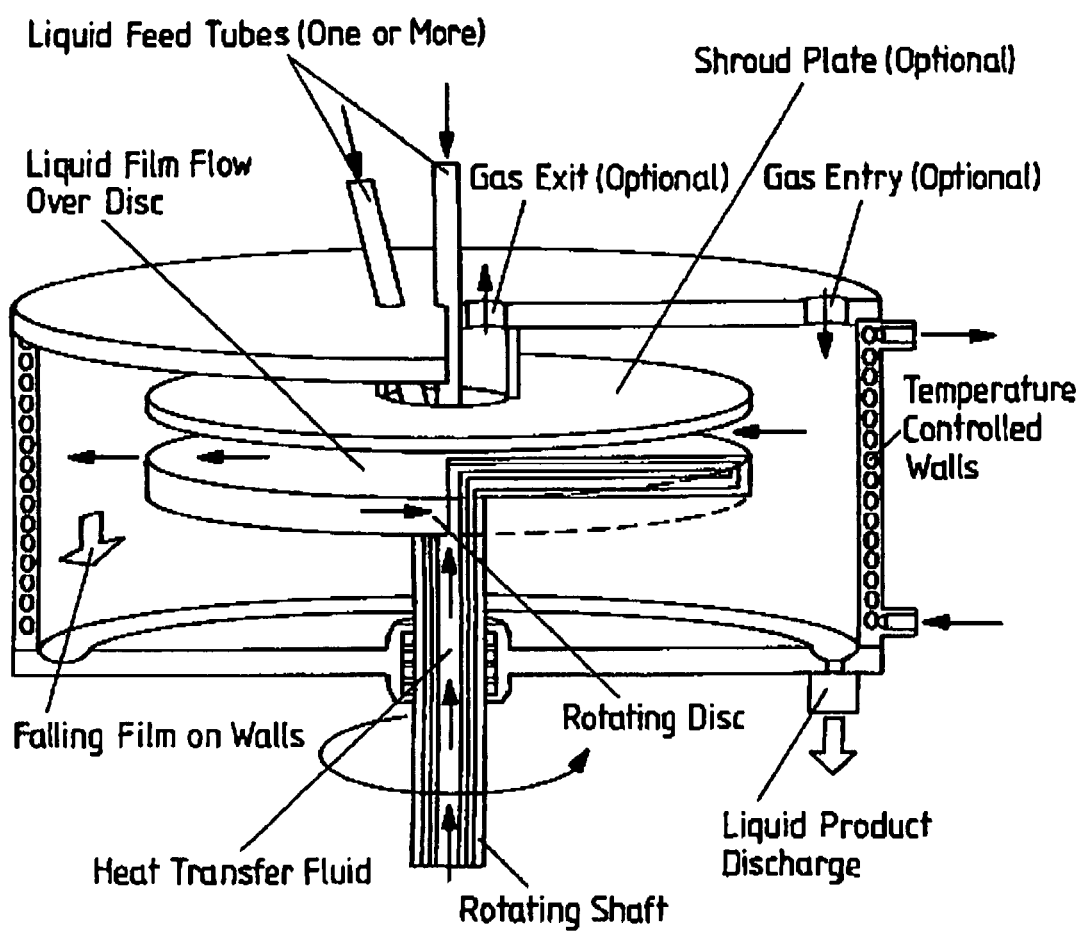
FIG. 1 shows the principal design of an SDR.

The SDR contains a reactor apparatus including a support element which is adapted to be rotatable to an axis, the support element having a surface to which the one or more reactants, in particular the nitrile rubber is supplied, and further including feed means for supplying the nitrile rubber to the surface of the support element and hydrogen and optionally the catalyst and the co-catalyst to the reactor.

Typically the SDR is a vessel, including a support element generally in the form of at least one disk, which is mounted on a shaft rotatable around an axis. The rotatable shaft typically carries a heat transfer fluid to the inner part of the disk. The walls of the vessel itself may be heated separately from the rotating disk. One or more liquids may be fed into the vessel through one or more feed tubes being located at or close to the centre of the rotatable disk, preferably at the top of the vessel. The SDR further comprises a gas entry in order to purge the system with hydrogen, nitrogen or the choosen gas of reaction.

The disk size typically lies in the range of from 0.005 to 1 m. The disk can be either smooth, grooved, edged or meshed depending e.g. on the throughput requirements. In the preset process it has proven particularly successful to use a grooved or edged surface to enhance wave formation of the solution film when moving across the disk to enhance reactivity. In most cases the disk is fabricated from copper, however it is also possible to use stainless steel or various other metals. Copper is preferred with regard to its excellent thermal conductivity, with a thin chrome plating for chemical resistance. An SDR has typically an overall heat transfer coefficient of approximately 7-20 kW/m$^2$K even for organic liquids.

In principle a typical system will consist of the main reactor containing the disk mounted on the rotatable shaft, a heater/cooler for the SDR walls, a heater/cooler for the SDR disk, a system controller and pumps. The system controller provides a compact integrated controller to control the disk speed, to monitor the vessel pressure and to control the feed speed from one or two integral feed pumps.

The object of the Spinning Disk Reactor is to generate a highly sheared liquid film when the liquid is applied to the unit at or near its center. The film is instantly accelerated tangentially by the shear stresses established at the disk/liquid interface. This causes the liquid to approach the disk's angular velocity and then move outward as a thinning/diverging film under the prevailing centrifugal acceleration. This force stretches and contorts the film. In more detail this means as the liquid moves towards the edge of the disk intense interfering waves are formed under the influence of the centrifugal force. This enables very high heat transfer coefficients to be realised between the disk and liquid, as well as a very high mass transfer between the liquid and the gas over the liquid. The waves formed also produce intense local mixing. The liquid flow involves very little back mixing and is therefore almost pure plug flow. The residence time is short, typically seconds. The films generated typically represent fractions of a millimeter down to a few microns. Through controlled flow and disk speed surface to volume ratios tailored to the processing requirements may be obtained, being in the range of hundredthousand of m$^2$ per m$^3$ for lower viscosity systems.

The principle of using rotatable equipment has first been mentioned in the middle of the 1980s, the SDR technology is e.g. described in WO-A-00/48718, WO-A-00/48729, WO-A-00/048731, WO-A-00/48732, WO-A-01/60511, WO-A-01/64332, WO-A-02/066150, WO-A-03/008083, WO-A-03/008460, WO-A-2004/004888, EP-A-1 464 389, WO-A-2006/008510, WO-A-2006/018622, WO-A-2003/082456, WO-A-2002/18328, WO-A-2001/14357 and WO-A-1999/36186.

A variety of applications have already been experienced. SDR technology has e.g. been used for stripping liquids of volatiles and scrubbing gases. According to WO-A-2003/008460 SDR technology has further been successfully used to perform free radical polymerization of styrene, condensation polymerization and photopolymerization of butyl acrylate. In WO-A-00/048731 it is described that SDR technology may be used for the conversion of a substantially fluid phase substrate by heterogeneous contact with a substantially solid phase agent. Said solid phase agent is immobilised as surface of the disk and the substrate provides a film flowing substantially radially outward from the axis in dynamic contact with the agent. The solid phase agent may e.g. be inorganic oxide catalysts, metals or alloy powders which are commonly used, e.g. in oxidation or hydrogenation. Said process may be used for the conversion of organics, such as prepolymerization, polymerisation, copolymerisation, blockcopolymerisation and the like as well as low-molecular reactions like etherification, dimerisation, or alkylation.

An application of the SDR technology to conversions of polymers or to polymer-analogous reactions, in particular to conversions on a polymer backbone has never been mentioned or published in the last twenty years. Additionally no reactions under high pressures have been reported using the SDR technology. The sole disclosure of using SDRs for reactions at normal pressure has obviously prevented artisans to try reactions at high pressure.

The novel process typically uses the nitrile rubber to be hydrogenated as solution in an organic solvent.

As organic solvents dichloromethane, benzene, toluene, acetone, cyclohexane, methylethylketone ("MEK") and monochlorobenzene ("MCB") may e.g. be used. Preferably MCB is used.

The NBR solution typically has a concentration in the range of from 2 to 25% b.w., preferably 3 to 20% b.w., more preferably 4 to 18% b.w., most preferably 10 to 18% b.w.

The NBR solution is preferably handled and stored under a nitrogen blanket.

The catalyst solution is prepared separately and also stored under nitrogen. This catalyst solution contains the catalyst and, preferably, the co-catalyst.

The process according to this invention is characterized in that the nitrile rubber solution is injected into the SDR onto the support element, preferably a disk, the system is then flushed with hydrogen, the reactor apparatus heated to a temperature in the range of from 25 to 200° C., preferably in the range of from 100 to 180° C. and most preferably in the range of from 110 to 160° C. and finally the catalyst solution, containing the catalyst and, preferably a co-catalyst, is injected into the SDR, preferably onto or close to the disk and the circulation process is begun.

The speed of the disk rotation lies generally in the range of from 100 to 4000 rpm, preferably in the range of from 500 to 2500 rpm and most preferably in the range of from 1000 to 2000 rpm. The disk temperature typically lies in a range of from 25 to 200° C., preferably in a range of from 100 to 180° C. and most preferably in a range of from 140 to 160° C.

The circulation process which begins has a typical solution circulation of 0.05 to 50 mL/s, preferably of 2 to 20 mL/s.

If desired, such SDR based hydrogenation process of nitrile rubbers may be scaled up and carried out in continuous manner by using an SDR with multiple disks or by using multiple units in series.

After the completion of the hydrogenation process the degree of hydrogenation typically lies in the range of from 20 to 100%, preferably in the range of from 70 to 100%, more preferably in the range of from 90 to 100% based on the original content of C═C double bonds in the nitrile rubber.

After the completion of the conversion the reaction mixture is removed from the SDR at the bottom of the SDR. The HNBR may be recovered using normal coagulation conditions such as either steam or alcohol. For the steam process the polymer solution is introduced into a vessel (equipped for agitation and heating) containing water. At this point steam is introduced into the water in order to remove the organic solvent. With reference to the alcohol method, the HNBR solution will be poured into a vessel (equipped with agitation) filled with alcohol (like e.g. ethanol or methanol) and the mixture will be stirred for a time period sufficient to abstract the organic solvent from the polymer and into the alcohol. In certain cases alkaline additives are introduced to control the pH level.

The HNBR obtained using the hydrogenation technique of the present invention possesses a Mooney viscosity in the range of from 1 to 150, preferably 20 to 120, most preferably 30 to 80, a molecular weight Mw in the range of from 20,000 to 500,000, preferably 50,000 to 350,000, a molecular weight Mn in the range of from 10,000 to 150,000, preferably 30,000 to 100,000 and a polydispersity index PDI in the range of from 1.5 to 5, preferably 2 to 3.5.

Utilization of Spinning Disk Reactor technology leads to the generation of thin NBR films. Such generation of thin NBR films removes the catalyst diffusion issue which is one of the limiting issue in nowadays batch-wise hydrogenation of NBR. The SDR based NBR hydrogenation is characterized by high heat and mass transfer coefficients, a plug flow, intense mixing capability, short residence times and low fouling.

This process allows for an extremely efficient hydrogenation of NBR with considerably more flexible, and cheaper equipment. The SDR based hydrogenation of NBR has a low operating inventory (around 10 cm$^3$ for a 5 m$^3$ batch equivalent). Complex safety requirements mandatory for batch reactors used on a technical scale, like e.g. relief and blow down systems involving bursting disks and/or relief valves, dump tanks, and fire protection are not necessary, as the process provides intrinsic safety. This means that location constraints are also reduced when using the new type of hydrogenation reactor.

Furtheron, if the feed to the SDR is stopped, the residual hold up becomes very low after a few seconds. Compared to the known batch-wise NBR hydrogenation grade change times and polymer losses are very small because of the low inventory and the plug flow nature of the flow. Rather than having expensive and possibly obsolete stock, specific HNBR grades may be manufactured rapidly and just in time for customers.

The inventive process results in improved selectivity, yield and product quality. It is easy to scale-up and provides the ability to run the hydrogenation at the speed at which it may run rather than run it at the speed at which the equipment permits it to run.

A further advantage of the present process resides in the fact that the hydrogen pressure applied to the SDR is preferably chosen in the range of from 0.5 to 100 bar, preferably in the range from 0.5 to 40 bar, most preferably in the range from 10 to 30 bar. This is substantially lower than in the batch-wise NBR hydrogenation.

EXAMPLES

Examples 1-3

The following chemicals have been used in the Examples described below:

Tris(triphenylphosphine)rhodium chloride (so called Wilkinson's hydrogenation catalyst), from Umicore AG & Co. KG Triphenylphosphine ("TPP") from BASF Aktiengesellschaft Perbunan® T 3429 NBR rubber with an acrylonitrile content of 34% b.w. and a Mooney-viscosity M(1+4)@100° C. of 28.2, $M_w$=255.000 g/mol, $M_n$=77.000 g/mol, PDE=3.31, said rubber being available from Lanxess Deutschland GmbH Monochlorobenzene ("MCB") available from Lanxess Deutschland GmbH A solution of 4% b.w. Perbunan® T 3429 in MCB was provided in a sealed vessel under a blanket of nitrogen. Furtheron a solution of tris(triphenylphosphine)rhodium chloride in MCB was prepared and triphenylphosphine as co-catalyst added. The catalyst-loading is given in the below Table 1. The amount of triphenylphosphine added was 1% b.w. based on 100% b.w. of the nitrile rubber.

All reactions were carried out in a stainless steal spinning disk (SDR) reactor of Protensive Limited, having the same design as outlined in Scheme 1 below. The SDR was equipped with an 11 cm disk.

The general reaction procedure followed in Examples 1-3 was as follows:

1. The solution of 4% b.w. of Perbunan® T 3429 under a nitrogen blanket was injected into the SDR vessel which itself was under a nitrogen blanket.
2. The SDR was heated to a temperature of 100° C. (vessel temperature and disk temperature).
3. The disk rotational speed (rpm) was set to 1000.
4. The catalyst solution, containing the catalyst and the co-catalyst, following nitrogen-purging was injected onto the disk.
5. Hydrogen pressure was added to a desired level as mentioned below in Table 1 for the time also indicated below in Table 1.
6. The disk temperature was adjusted as indicated below in Table 1.
7. The circulation process was begun with a solution circulation of 2 mL/s.
8. When the reaction was complete the $H_2$ pressure was removed and the solution drained from the vessel.
9. The SDR was then cleaned with MCB.

TABLE 1

Reaction parameters

| Example | Hydrogen pressure (bar) | Catalyst Loading (phr) | Disk Temperature (° C.) | Time (min) |
| --- | --- | --- | --- | --- |
| 1 | 10 | 0.36 | 135 | 240 |

TABLE 1-continued

Reaction parameters

| Example | Hydrogen pressure (bar) | Catalyst Loading (phr) | Disk Temperature (° C.) | Time (min) |
|---|---|---|---|---|
| 2 | 3.5 | 0.36 | 135 | 240 |
| 3 | 9.8 | 0.60 | 150 | 240 |

The molecular weights $M_w$, $M_n$, the polydispersity PDI and the solution viscosity of the HNBR obtained in Exampels 1-3 are listed in the following Table 2.

The solution viscosity was measured by Brookfield Viscosity technique.

The Brookfield Viscometer instrument purchased from Brookfield Engineering (www.brookfieldengineering.com) was of type model LVDV-II+Pro. The Brookfield Viscometer was equipped with LV spindles of which spindle LV-2 (S62) was utilized for the testing process of those values reported in Table 2. The examples listed in Table 2 were diluted to 4% total solids prior to viscosity testing. During testing the Brookfield viscometer was set to a speed of 60 rpm and the temperature of the solution was held at 22° C.+/−1° C.

TABLE 2

Results

| Example | $M_n$ (g/mol) | $M_w$ | PDI | Solution Viscosity (cP) | RDB[1] [%] |
|---|---|---|---|---|---|
| Perbunan ® T 3429 | 72000 | 235000 | 3.27 | 19.0 | — |
| 1 | 69000 | 143000 | 2.09 | 90.5 | 6.0 |
| 2 | 62000 | 139000 | 2.23 | 40.5 | 25.4 |
| 3 | 81000 | 161000 | 1.99 | 91.0 | 0.9 |

[1]"RDB" means remaining C=C double bonds in % based on the original amount of C=C double bonds in the starting material Perbunan ® T 3429

What is claimed is:

1. A process for preparing a hydrogenated nitrile rubber comprising subjecting a nitrile rubber in a spinning disk reactor to hydrogenation wherein the hydrogen pressure applied to the spinning disk reactor lies in the ranges of from 3.5 bar to 100 bar.

2. The process according to claim 1, wherein the nitrile rubber has repeating units derived from at least one conjugated diene, at least one α,β-unsaturated nitrile, and optionally one or more copolymerizable monomers.

3. The process according to claim 1, wherein the hydrogenation of the nitrile rubber is carried out in the presence of a hydrogenation catalyst.

4. The process according to claim 3, wherein the hydrogenation of the nitrile rubber is carried out in the presence of a homogeneous hydrogenation catalyst.

5. The process according to claim 4, wherein the hydrogenation of the nitrile rubber is carried out in the presence of a homogeneous catalyst derived from rhodium, ruthenium, titanium, platinum, iridium, palladium, rhenium, osmium, cobalt or copper either as metal or in form of metal compounds.

6. The process according to claim 5, wherein the hydrogenation of the nitrile rubber is carried out in the presence of a rhodium or ruthenium containing catalyst.

7. The process according to claim 6, wherein the hydrogenation of the nitrile rubber is carried out in the presence of a catalyst of the following general formula (I)

$$(R^1_m B)_l MX_n \quad (I)$$

wherein
M is ruthenium or rhodium,
$R^1$ are different or equal and represent $C_1$-$C_8$-alkyl, $C_4$-$C_8$-cycloalkyl, $C_6$-$C_{15}$-aryl or $C_7$-$C_{15}$-aralkyl,
B is phosphorus, arsenic, sulphur or a sulphoxide group (S=O),
X is hydrogen or an anion,
l is 2, 3 or 4,
m is 2 or 3 and
n is 1, 2 or 3.

8. The process according to claim 7, wherein the hydrogenation of the nitrile rubber is carried out in the presence of tris(triphenylphosphine)-rhodium(I)-chloride, tris(triphenylphosphine)-rhodium(III)-chloride, tris(dimethylsulfoxide)-rhodium(III)-chloride, tetrakis(triphenyl phosphine)-rhodium-hydride, and the corresponding compounds in which the triphenylphosphine moiety is partially or completely replaced by tricyclohexylphosphine.

9. The process according to claim 3, wherein the hydrogenation of the nitrile rubber is carried out in the presence of a co-catalyst.

10. The process according to claim 9, wherein the hydrogenation of the nitrile rubber is carried out in the presence of a co-catalyst having the general formula (II)

$$R^1_m B \quad (II)$$

wherein $R^1$, m and B shall have the same meanings as for the general formula (I).

11. The process according to claim 10, wherein m is 3, B is phosphorus and the substituents $R^1$ are different or equal and represent $C_1$-$C_8$-alkyl, $C_4$-$C_8$-cycloalkyl, $C_6$-$C_{15}$-aryl or $C_7$-$C_{15}$-aralkyl.

12. The process according to claim 1, wherein the spinning disc reactor contains a reactor apparatus including a support element which is adapted to be rotatable to an axis, the support element having a surface to which the nitrile rubber is supplied, and further including feed means for supplying the nitrile rubber to the surface of the support element and hydrogen and the catalyst and optionally the co-catalyst to the reactor.

13. The process according to claim 1, wherein the spinning disc reactor contains a vessel including (i) a support element in the form of at least one disk which is mounted on a rotatable shaft carrying a heat transfer fluid to the inner part of the disk, (ii) one or more feed tubes being located at or close to the centre of the rotatable disk, (iii) a separate heating possibility of the walls of the vessel and the rotating disk, and (iv) a gas entry to purge the system with hydrogen and/or nitrogen.

14. The process according to claim 13, wherein the disk size lies in the range of from 0.005 to 1 m.

15. The process according to claim 1, wherein the nitrile rubber is used as solution in an organic solvent, selected from the group consisting of dichloromethane, benzene, toluene, acetone, cyclohexane, methylethylketone or monochlorobenzene.

16. The process according to claim 15, wherein the nitrile rubber solution has a concentration in the range of from 2 to 26 by weight.

17. The process according to claim 15, wherein the nitrile rubber solution is injected into the spinning disc reactor onto a support element, the system is flushed with hydrogen, the reactor apparatus is heated to a temperature in the range of from 25 to 200° C., and the catalyst solution, containing the catalyst and optionally the co-catalyst, is injected into the spinning disc reactor, and the circulation process is begun.

18. The process according to claim 3, wherein the catalyst is used in an amount in the range from 0.005-1% by weight of the nitrile rubber to be hydrogenated.

19. The process according to claim 9, wherein 0.1 to 33% by weight of the co-catalyst are used, based on 100% by weight of the nitrile rubber to be hydrogenated.

20. The process according to claim 12, wherein the speed of the disk rotation lies in the range of from 100 to 4000 rpm, and the disk temperature in a range of from 25 to 200° C.

21. The process according to claim 20, wherein the speed of the disk rotation lies in the range of from 500 to 2500 rpm, and the disk temperature in a range of from 100 to 180° C.

22. The process according to claim 17, wherein the circulation process which begins has a solution circulation of 0.05 to 50 mL/s.

23. The process according to claim 17, wherein the circulation process which begins has a solution circulation of 2 to 20 mL/s.

24. The process according to claim 1, wherein the hydrogen pressure applied to the SDR lies in the range of from 10 to 100 bar.

* * * * *